(12) United States Patent
Lindsay

(10) Patent No.: US 7,954,872 B2
(45) Date of Patent: Jun. 7, 2011

(54) NESTING SEATS FOR IMPROVED INGRESS/EGRESS

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/607,217

(22) Filed: Oct. 28, 2009

(65) Prior Publication Data

US 2011/0095558 A1    Apr. 28, 2011

(51) Int. Cl.
*B60N 2/01* (2006.01)
*B60N 2/30* (2006.01)
(52) U.S. Cl. ............... 296/64; 297/232; 297/239
(58) Field of Classification Search ............ 296/64, 296/65.01, 65.13, 65.14; 297/232, 239, 248, 297/249, 257
See application file for complete search history.

(56) References Cited

U.S. PATENT DOCUMENTS

| | | | |
|---|---|---|---|
| 1,078,602 A | 11/1913 | Morgan | |
| 1,177,951 A * | 4/1916 | Hupp | 296/65.14 |
| 5,611,589 A | 3/1997 | Fujii et al. | |
| 6,065,798 A | 5/2000 | Sankrithi | |
| 6,457,765 B1 * | 10/2002 | Bergquist et al. | 296/64 |
| 6,773,050 B1 * | 8/2004 | Hotary et al. | 296/64 |
| 6,817,645 B2 | 11/2004 | Taguchi et al. | |
| 7,380,859 B2 * | 6/2008 | Gardiner | 296/64 |
| 7,547,057 B2 * | 6/2009 | Kim et al. | 296/65.01 |
| 7,845,724 B2 * | 12/2010 | Scheinberg | 297/232 |
| 2004/0036330 A1 | 2/2004 | Itami et al. | |
| 2009/0072572 A1 | 3/2009 | Scheinberg | |

* cited by examiner

*Primary Examiner* — Glenn Dayoan
*Assistant Examiner* — Gregory Blankenship
(74) *Attorney, Agent, or Firm* — Rankin Hill & Clark LLP

(57) ABSTRACT

A seating arrangement for a motor vehicle can include first row seats including a driver's seat and a passenger's seat, and second row seats disposed behind the first row seats with respect to a forward direction of travel for the motor vehicle. The second row seats can be slidable in longitudinal direction between a forward position and a rearward position. Respective rear surfaces of the first row seats can define a rear curved surface between an outboard lateral edge of the passenger seat and an outboard lateral edge of the driver's seat. Respective forward surfaces of the second row seats can define a front curved surface between respective outboard lateral edges of the second row seats. The front curved surface can correspond in shape and dimensions with the rear curved surface, such that the second row seats nest with the first row seats, when the second row seats are moved toward the forward position.

19 Claims, 4 Drawing Sheets

NESTING SEATS FOR IMPROVED INGRESS/EGRESS

BACKGROUND

The present disclosure generally relates to a seating arrangement for a motor vehicle. Vehicles having two or three rows of seating are known to include sliding seats positioned behind a first row of seats. The sliding seats can be moved into a forward position to provide access to a rearward portion of the vehicle cabin located the behind the sliding row of seats. For example, vehicles having three rows of seating are known to provide increased passenger ingress and egress space to and from a third row of seating by sliding the second row of seating into the forward position. Vehicles having two rows of seating are also known to provide ingress and egress space to and from a cargo area located behind the second row of seating by sliding the second row of seating into the forward position.

To provide this increased ingress/egress space to the third row of seats or to the cargo area, complicated seating arrangements have been utilized. For example, a known seating arrangement for a vehicle includes a first row of seats, a second row of seats, and a third row of seats that are arranged lengthwise in order on a vehicle floor. A center seat is arranged to move axially in a fore-and-aft direction on parallel rails mounted on the vehicle floor. The center seat can slide between a rear position, where the center seat is positioned between the left and right seats of the third row of seat, and a front position, where the center seat is positioned between the left and right seats of the second row of seats. When in the rear position, a passenger can travel to the third row of seats through the opening provided between the left and right seats in the second row of seats.

Another vehicle seating arrangement includes a rear seat assembly that nests or spoons against a front seat assembly. In this arrangement, however, a base of the rear seat assembly slides underneath a base of the front seat assembly, which requires the rear seat assembly to both pivot and slide with respect to the vehicle floor.

Another known vehicle seating arrangement includes rear passenger seat positioned behind a driver's seat and another passenger seat alongside the driver's seat. Each of the two rear passenger seats includes a lower seat part that is pivoted in relation to a backrest part so that the lower seat part can assume a folded up position against the backrest part. When in the folded up position, the two rear passenger seats can slide toward a forward position toward the driver's seat and the passenger seat alongside the driver's seat.

SUMMARY

An example of a seating arrangement for a motor vehicle that can provide increased ingress/egress space in a less complicated manner can include first row seats including a driver's seat and a passenger's seat, and second row seats disposed behind the first row seats with respect to a forward direction of travel for the motor vehicle. The second row seats can be slidable in longitudinal direction between a forward position and a rearward position. Respective rear surfaces of the first row seats can define a rear curved surface between an outboard lateral edge of the passenger seat and an outboard lateral edge of the driver's seat. Respective forward surfaces of the second row seats can define a front curved surface between respective outboard lateral edges of the second row seats. The front curved surface can correspond in shape and dimensions with the rear curved surface, such that the second row seats nest with the first row seats, when the second row seats are moved toward the forward position.

Another example of a seating arrangement for a motor vehicle that can overcome the aforementioned shortcomings includes a first row seat and a second row seat. The first row seat includes a seat back having a contoured rear surface defining a rear curve in a plane that is parallel to a lateral and a longitudinal axis of the motor vehicle. The second row seat laterally aligns with and is disposed behind the first row seat with respect to a forward direction of travel for the motor vehicle. The second row seat is slidable in a longitudinal direction between a forward position and a rearward position. The second row seat includes a base having a contoured forward surface defining a forward curve in the plane that is parallel to the lateral and longitudinal axis of the motor vehicle. When in the forward position, a forwardmost point on the forward curve is disposed forward a rearwardmost point on the rear curve and a rearwardmost point on the forward curve is also disposed rearward the rearwardmost point on the rear curve.

Another example of a seating arrangement for a motor vehicle includes first row seats and second row seats. The first row seats include a driver's seat, a passenger's seat, and a center console disposed between the driver's seat and the passenger's seat. Respective rear surfaces of the first row seats define a rear contoured surface between an outboard lateral edge of the passenger's seat and an outboard lateral edge of the driver's seat. A rear surface of the center console defines a portion of the rear contoured surface. The second row seats are disposed behind the first row seats with respect to a forward direction of travel for the motor vehicle. The second row seats are slidable in a longitudinal direction between a forward position and a rearward position. Respective forward surfaces of the second row seats define a front contoured surface between respective outboard lateral edges of the second row seats. The front contoured surface includes a recessed section corresponding in shape and dimensions with the portion of the rear contoured surface defined by the rear surface of the center console such that the second row seats nest with the first row seats including the center console when the second row seats are moved toward the forward position.

BRIEF DESCRIPTION OF THE DRAWINGS

FIG. 1 depicts second row seats disposed in a forward position.

FIG. 2 depicts second row seats disposed in the forward position.

DETAILED DESCRIPTION

Figure 1:
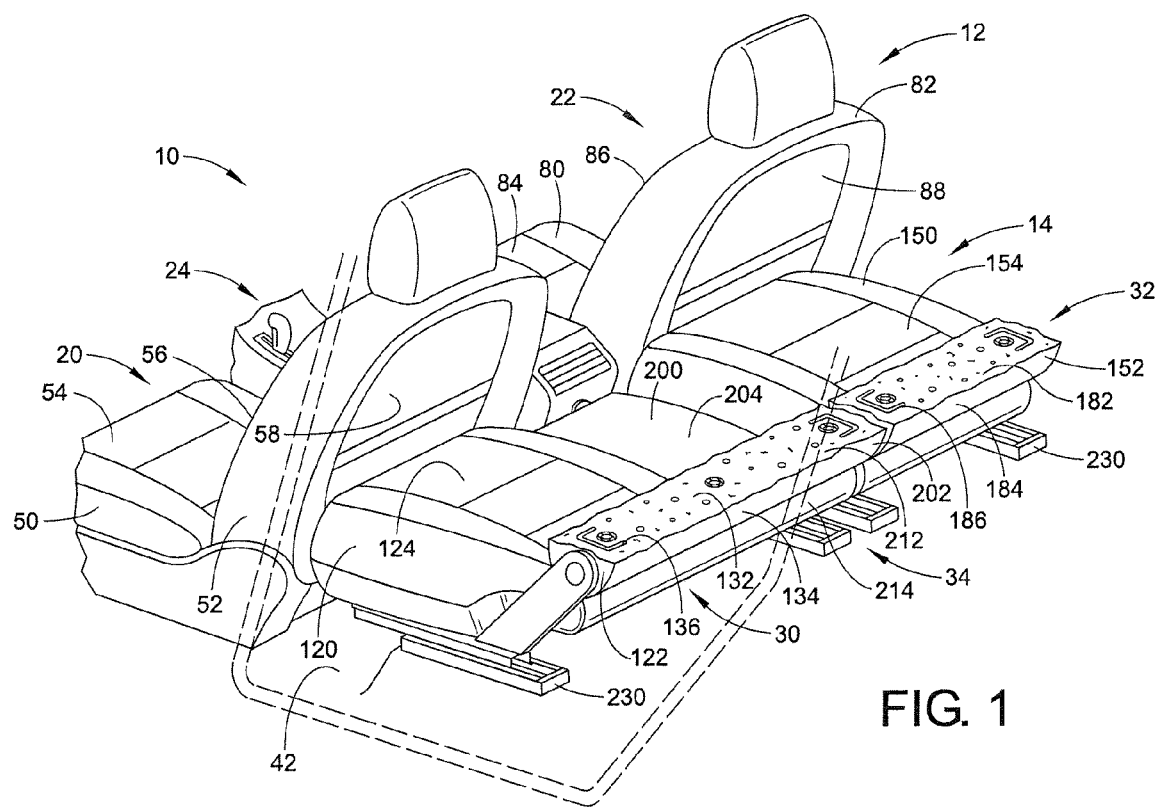
FIG. 1 depicts a rear perspective view of a seating arrangement for a motor vehicle. Seat backs of second row seats are shown in a cross section taken through a plane that is parallel to a lateral and a longitudinal axis of the motor vehicle.
Figure 2:
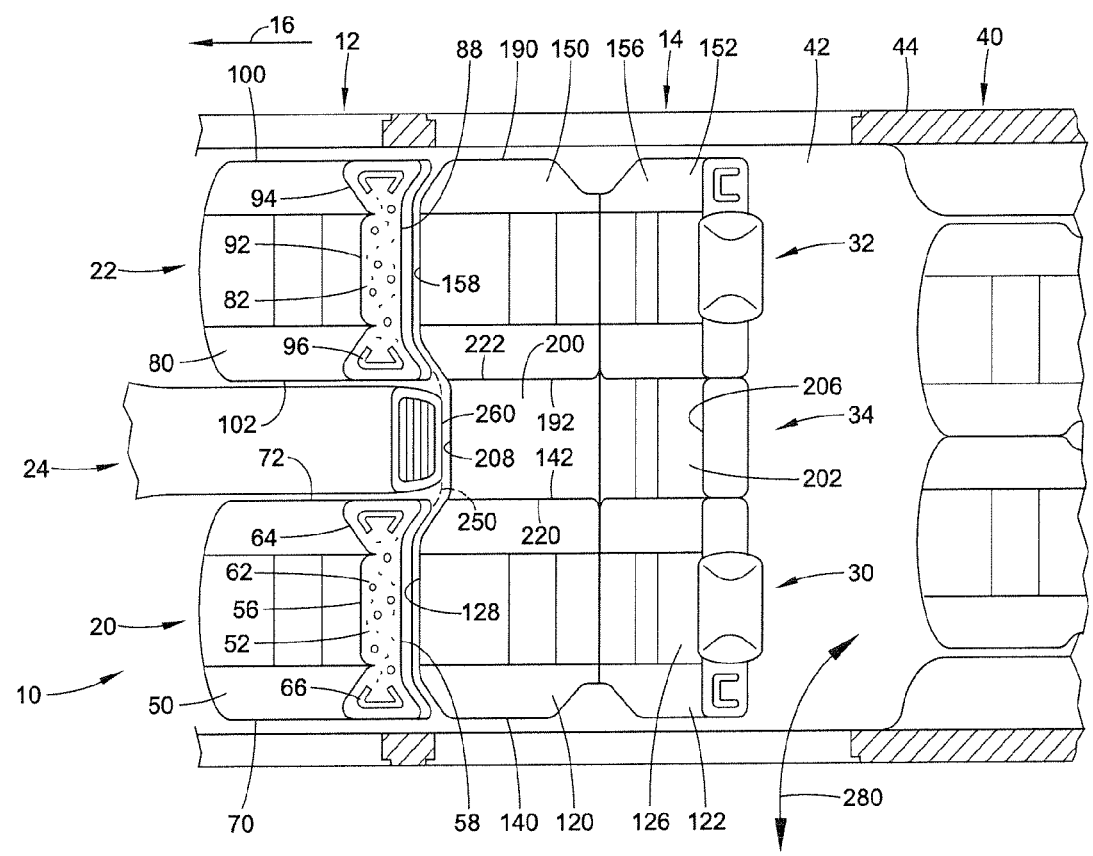
FIG. 2 depicts a top plan view of the seating arrangement shown in FIG. 1 also showing third row seats. Seat backs of first row seats are shown in a cross section taken through the plane that is parallel to a lateral and a longitudinal axis of the motor vehicle.
Figure 3:
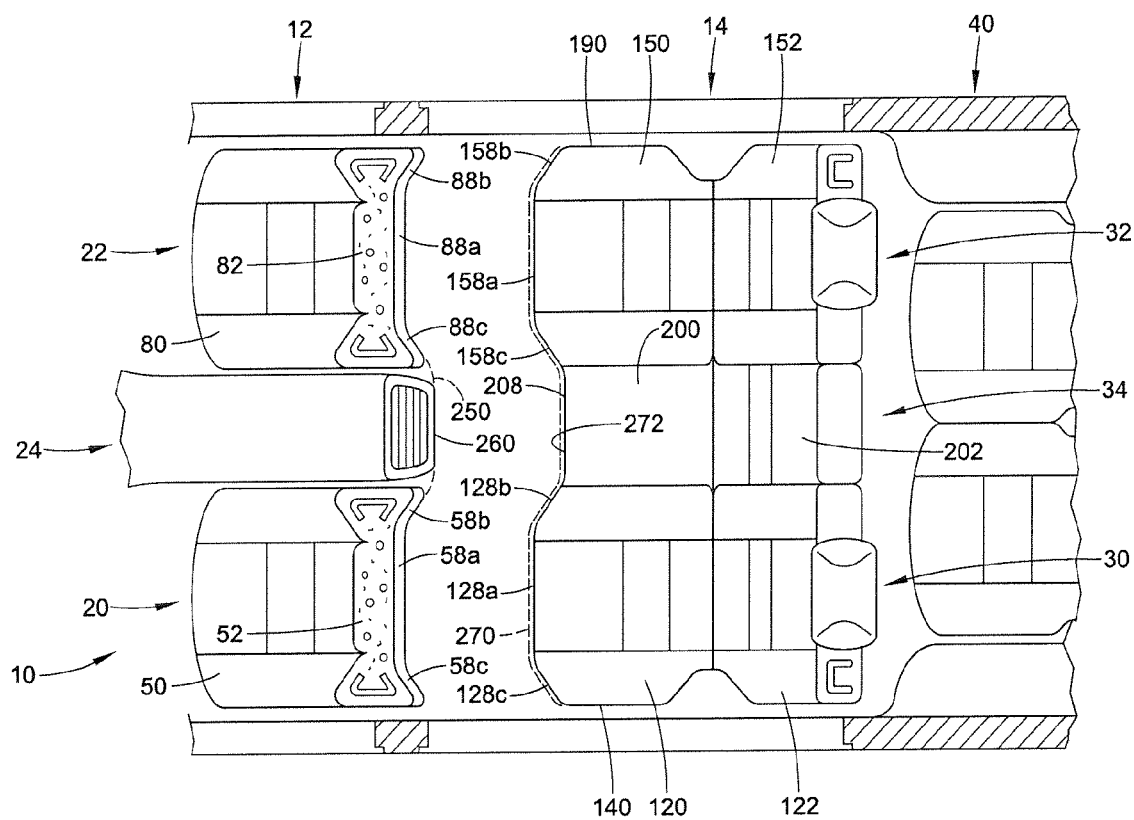
FIG. 3 is a top plan view similar to FIG. 2; however, the second row seats are shown in a rearward position.

With reference to FIG. 1, a seating arrangement 10 for a motor vehicle includes first row seats 12 and second row seats 14 disposed behind the first row seats with respect to a forward direction 16 (FIG. 2) of travel for the motor vehicle. In the illustrated embodiment, the first row seats 12 include a driver's seat 20 and a passenger's seat 22. For the seating arrangement 10 depicted in the figures, a center console 24 is disposed between the driver's seat 20 and the passenger seat 22. The second row seats 14 in the illustrated embodiment include a left seat 30, a right seat 32, and a middle seat 34 that is disposed between the left seat and the right seat. With reference to FIGS. 2 and 3, the seating arrangement can also include third row seats 40 disposed behind the second row seats 14 with respect to the forward direction 16 of travel for the motor vehicle. The first row seats 12, the second row seats 14, and the third row seats 40 mount to a floor 42 connected to a vehicle frame 44 of the motor vehicle.

With reference back to FIG. 1, the driver's seat 20 includes a base 50 and a seat back 52, which is similar to conventional vehicle seats. The seat back 52 can pivot with respect to the base 50. When in an operating position, such as that shown in FIG. 1, the base 50 includes a generally horizontal resting surface 54 upon which an occupant of the driver's seat 20 rests. Also in the operating position, the seat back 52 includes a generally vertically oriented forward support surface 56 against which the occupant's back rests when seated on the driver's seat. The driver's seat 20 also includes a contoured rear surface 58.

With reference to FIG. 2, the driver's seat 20 also includes cushions (only a cushion 62 in the seat back 52 is visible; however, a cushion can also be provided in the base 50). Upholstery 64 can cover the cushion 62 and frame elements 66, which can be conventional. The base 50 also includes upholstery and frame elements, which can be of conventional design. With continued reference to FIG. 3, the driver's seat 20 can include an outboard lateral edge 70 and an inboard lateral edge 72.

With reference back to FIG. 1, the passenger's seat 22 also includes a base 80 and a seat back 82, which is similar to conventional vehicle seats. The seat back 82 can pivot with respect to the base 80. When in an operating position, such as that shown in FIG. 1, the base 80 includes a generally horizontal resting surface 84 upon which an occupant of the passenger's seat 22 rests. Also in the operating position, the seat back 82 includes a generally vertically oriented forward support surface 86 against which the occupant's back rests when seated on the passenger's seat 22. The passenger's seat 22 also includes a contoured rear surface 88.

With reference to FIG. 2, the passenger's seat 22 also includes cushions (only a cushion 92 in the seat back 82 is visible; however, a cushion can also be provided in the base 80), upholstery 94, and frame elements 96. The base 80 also includes upholstery and frame elements, which can be of conventional design. With continued reference to FIG. 3, the passenger's seat 22 can include an outboard lateral edge 100 and an inboard lateral edge 102.

As mentioned above, the second row seats 14 include the left seat 30, the right seat 32, and the middle seat 34. The second row seats 14 are slidable in a longitudinal direction, which is parallel to the forward direction 16 of travel for the vehicle, between a forward position (FIG. 2) and a rearward position (FIG. 3). In FIG. 1, the left seat 30 and the middle seat 34 are shown to be on integral unit, i.e., the left seat 30 does not move with respect to the middle seat 34. In FIG. 2, however, the left seat 30 is shown separated from the middle seat 34, which would allow the left seat 30 to move with respect to the middle seat 34. If desired, the left seat 30 can move with respect to the right seat 32 and the middle seat 34 between the forward position and the rearward position. In other words, the left seat 30 can occupy the forward position while the right seat 32 and the middle seat 34 are in the rear position. Each seat can be movable with respect to the other seats. Alternatively, the second row seats 14 can be a bench seat, i.e. the second row seats 14 can move as one unit.

Figure 5:
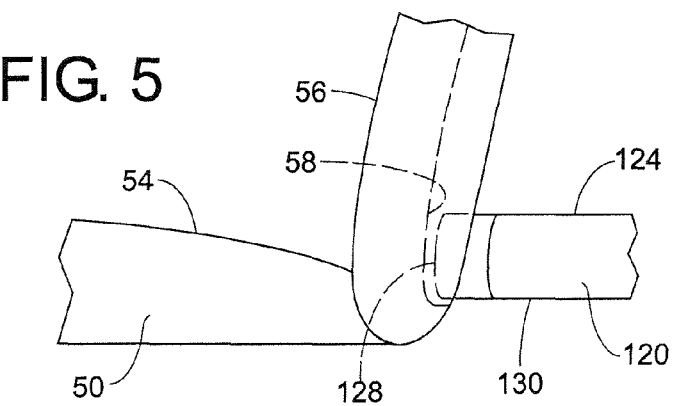
FIG. 5 is a side elevation view of a first row seat and a second row seat of the seating arrangement shown in FIGS. 1-3.

With reference back to the illustrated embodiment, the left seat 30 includes a seat base 120 and a seat back 122. The seat back 122 can pivot with respect to and towards the seat base 120. When in an operating position, the seat base 120 includes a generally horizontal resting surface 124 upon which an occupant of the left seat 30 rests. With reference to FIG. 2, when in the operating position, the seat back 122 includes a generally vertically oriented support surface 126 against which rests the back of a passenger seated in the left seat 30. With reference to FIG. 3, the base 120 of the left seat 30 includes a contoured generally vertically oriented forward surface 128. With reference to FIG. 5, the forward surface 128 extends from the horizontal resting surface 124 downwardly to a lower surface 130 of the base 120.

With reference back to FIG. 1, the left seat 30 can include cushions (only the cushion 132 is visible in the seat back 122; however, a similar cushion can be provided in the seat base 120). The left seat 30 can also include upholstery 134 and frame elements 136, which are similar to conventional seats. With reference to FIG. 2, the left seat 30 includes an outboard lateral edge 140 and can also include an inboard lateral edge 142.

The right seat 32 in the second row seats 14 includes a seat base 150 and a seat back 152. The seat back 152 can pivot with respect to and towards the seat base 150. When in an operating position, the seat base 150 includes a generally horizontal resting surface 154 upon which an occupant of the right seat 32 rests. With reference to FIG. 2, when in the operating position, the seat back 152 includes a generally vertically oriented support surface 156 against which rests the back of a passenger seated in the right seat 32. With reference to FIG. 3, the base 150 of the right seat 32 includes a contoured generally vertically oriented forward surface 158. Similar to the forward surface 128 for the left seat 30 shown in FIG. 5, the forward surface 158 for the right seat 32 extends from the horizontal resting surface 154 downwardly to a lower surface (not visible) of the base 150. With reference back to FIG. 1, the right seat 32 can include cushions (only the cushion 182 is visible in the seat back 152; however, a similar cushion can be provided in the seat base 150). The right seat 32 can also include upholstery 184 and frame elements 186, which are similar to conventional seats. With reference back to FIG. 2, the left seat 30 includes an outboard lateral edge 190 and can also include an inboard lateral edge 192.

The middle seat 34 in the second row seats 14 also includes a seat base 200 and a seat back 202. The seat back 202 can pivot with respect to and towards the seat base 200. When in an operating position, the seat base 200 includes a generally horizontal resting surface 204 upon which an occupant of the middle seat 34 rests. With reference to FIG. 2, when in the operating position, the seat back 202 includes a generally vertically oriented support surface 206 against which rests the back of a passenger seated in the middle seat 34. With reference to FIG. 3, the base 200 of the middle seat 34 includes a contoured generally vertically oriented forward surface 208. Similar to the forward surface 128 for the left seat 30 shown in FIG. 5, the forward surface 208 for the middle seat 34 extends from the horizontal resting surface 204 downwardly to a lower surface (not visible) of the base 200. With reference back to FIG. 1, the middle seat 34 can include cushions (only a cushion 212 is visible in the seat back 202; however, a similar cushion can be provided in the seat base 200). The middle seat 34 also includes upholstery 214 and frame elements 216, which are similar to conventional seats. The middle seat 34 includes a left lateral edge 220 and can also include a right lateral edge 222.

With reference back to FIG. 1, the second row seats 14 attach to rails 230. Four rails are shown in FIG. 1, however, a fewer or a greater number of rails can be provided. The rails 230 attach to the vehicle floor 42. The attachment of the second row seats 14 to the rails 230 allows the second row seats to be slidable in the longitudinal direction, which is parallel to the forward direction 16 of travel for the motor vehicle, between a forward position (shown in FIG. 2) and a rearward position (shown in FIG. 3). The second row seats 14 can attach to the vehicle floor 42 in other conventional manners that will allow the second row seats to slide in the longitudinal direction.

With reference back to FIG. 2, respective rear surfaces, e.g. the rear surface 58 and the rear surface 88, of the first row seats 12 define a rear curved surface (a portion of which is depicted by a dashed line 250 in FIG. 3) between the outboard lateral edge 100 of the passenger's seat 22 and the outboard lateral edge 70 of the driver's seat 20. The center console 24, which is disposed between the driver's seat 20 and the passenger seat 22, includes a contoured rear surface 260. The rear surface 260 of the center console 24 can further define the rear curved surface 250.

With continued reference to FIG. 3, the driver's seat 20 includes the seat back 52 having the contoured rear surface 58. In the embodiment illustrated in FIGS. 1-3, the contoured rear surface 58 is generally concave and, as shown in FIG. 3, can include a central portion 58a that is recessed forwardly with respect to an inboard portion 58b and an outboard portion 58c. The contoured rear surface 58 can further define a rear curve in a plane that is parallel to a lateral and a longitudinal axis of the motor vehicle. FIG. 3 depicts the plane that is parallel to the lateral and the longitudinal axis of the motor vehicle by way of the cross section taken through the seat back 52. In the embodiment illustrated in FIGS. 2 and 3, in cross sections taken parallel to the longitudinal direction and the lateral direction, the rear surface 58 of the driver's seat 20 defines a concave curve.

The passenger's seat 22 in the first row seats 12 also includes the seat back 82 having the contoured rear surface 88. In the embodiment illustrated in FIGS. 1-3, the contoured rear surface 88 is also generally concave and can include, as shown in FIG. 3, a central portion 88a that is recessed forwardly with respect to an outboard portion 88b and an inboard portion 88c. The contoured rear surface 88 can further define a rear curve in a plane that is parallel to a lateral and a longitudinal axis of the motor vehicle. FIG. 3 depicts the plane that is parallel to the lateral and the longitudinal axis of the motor vehicle by way of the cross section taken through the seat back 82. In the embodiment illustrated in FIGS. 2 and 3, in cross sections taken parallel to the longitudinal direction and the lateral direction, the rear surface 88 of the passenger's seat 22 defines a concave curve.

Respective forward surfaces, e.g. forward surface 128, forward surface 158, and forward surface 208, of the second row seats 14 define a front curved surface (depicted schematically by the curve 270, which is slightly forwardly offset from the front curved surface) between respective outboard lateral edges, e.g. the outboard lateral edge 140 of the left seat 30 and the outboard lateral edge 190 of the right seat 32. The front curve 270 in the illustrated embodiment corresponds in shape and dimensions with the rear curve 260 such that the second row seats 14 nest with the first row seats 12 when the second row seats are moved toward the forward position (as shown in FIG. 2).

With continued reference to the embodiment illustrated in FIGS. 2 and 3, the base 120 of the left seat 30 includes the contoured forward surface 128, which includes a central portion 128a, an inboard portion 128b, and an outboard portion 128c. In the embodiment illustrated in FIGS. 2 and 3, the contoured forward surface 128 is generally convex where the central portion 128a is disposed forwardly with respect to the inboard portion 128b and the outboard portion 128c. The contoured forward surface 128 also defines a forward curve in the plane that is parallel to the lateral and longitudinal axes of the motor vehicle.

Similarly, the base 150 of the right seat 32 includes the contoured forward surface 158, which includes a central portion 158a, an outboard portion 158b, and an inboard portion 158c. In the embodiment illustrated in FIGS. 2 and 3, the contoured forward surface 158 is generally convex where the central portion 158a is disposed forwardly with respect to the outboard portion 158b and the inboard portion 158c. The contoured forward surface 158 also defines a forward curve in the plane that is parallel to the lateral and longitudinal axes of the motor vehicle.

In FIG. 2 the second row seats 14 are shown in the forward position where the second row seats nest with the first row seats 12. When in the forward position, a forwardmost point, e.g. a point located on the central portion 128a or on the central portion 158a, on the forward curve 270 is disposed forward a rearwardmost point, e.g. a point on the inboard portion 58b or the outboard portion 58c or a point on the outboard portion 88b or inboard portion 88c, on the rear curve 260. Also, a rearwardmost point, e.g. a point on the inboard portion 128b or the outboard portion 128c or a point on the outboard portion 158b or on the inboard portion 158c, on the forward curve 270 is disposed rearward the rearwardmost point, e.g. a point on the inboard portion 58b or the outboard portion 58c or a point on the outboard portion 88b or inboard portion 88c, on the rear curve 260. Such a configuration allows the second row seats 14 to nest with the first row seats 12 to increase an ingress/egress area 280 (FIG. 2) for an occupant of the third row seats 40 (or an area behind the second row seats 14).

Figure 4:
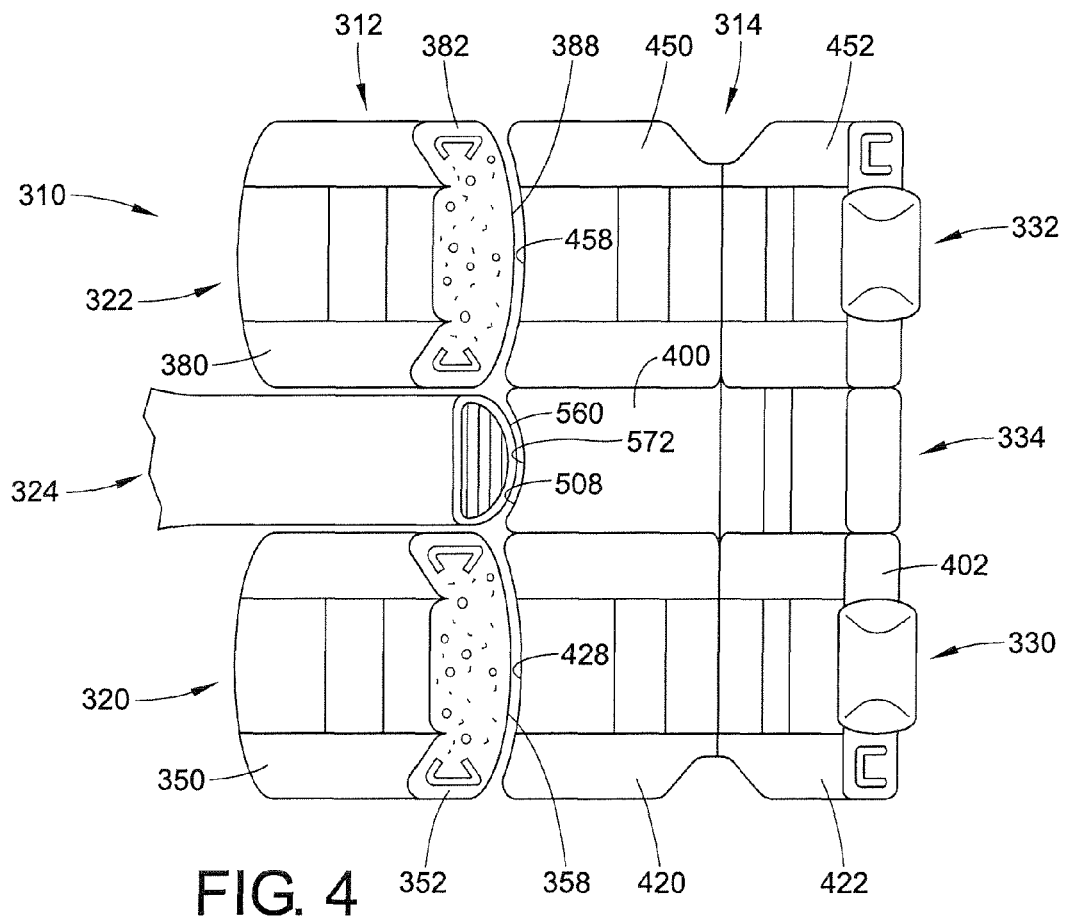
FIG. 4 is a top plan view, similar to the top plan views shown in FIGS. 2 and 3, depicting an alternative seating arrangement for a motor vehicle. Second row seats are shown in a forward position.

FIG. 4 depicts an alternative seating arrangement 310 for a motor vehicle. Similar to the seating arrangement with reference to FIGS. 1-3, the seating arrangement 310 includes first row seats 312 and second row seats 314. Third row seats, which are not shown, could also be provided. The first row seats include a driver's seat 320 and a passenger seat 322. Additionally, a center console 324 can be disposed between the driver's seat 320 and the passenger seat 322. The second row seats 314 includes a left seat 330, a right seat 332, and a middle seat 334, which is disposed between the left seat and the right seat.

The driver's seat 320 includes a base 350 and a seat back 352. The difference between the driver's seat 320 shown in FIG. 4 and the driver's seat 20 shown in FIG. 2 is that the driver's seat 320 includes a convex rear surface 358, as compared to the concave rear surface 58 depicted in FIGS. 2 and 3. Similarly, the passenger seat 322 includes a base 380 and a seat back 382. Different than the embodiment depicted in FIGS. 2 and 3, the passenger seat 322 in the embodiment illustrated in FIG. 4 includes a convex rear surface 388, as compared to the concave rear surface 88 depicted in FIG. 2.

The left seat 330 of the second row seats 314 includes a base 420 and a seat back 422. Different than the embodiment depicted in FIGS. 2 and 3, the left seat 330 includes a concave forward surface 428, as opposed to the convex surface 128 depicted in FIGS. 2 and 3. The right seat 332 of the second row seats 314 includes a base 450 and a seat back 452. Different than the embodiment depicted in FIGS. 2 and 3, the right seat 332 includes a concave forward surface 458, as opposed to the convex surface 158 depicted in FIGS. 2 and 3. Nevertheless, the second row seats 314 nest with the first row seats 312 when in the forward position (shown in FIG. 4) in much the same manner as the embodiment depicted in FIGS. 2 and 3.

The middle seat 334 of the second row seats 314 includes a base 500 and a seat back 402. Similar to the embodiment depicted in FIGS. 2 and 3, the middle seat 334 includes a concave forward surface 508.

In each of the depicted embodiments, the left seat 30, 330, nests with the driver's seat 20, 320, and the right seat 32, 332, nests with the passenger seat 22, 322. Even though each seat back, e.g. seat backs 122, 152, 422 and 452, of the rear seats 14, 314 pivots with respect to the respective base, e.g. bases 120, 150, 420 and 450, the seat back can be upright when the second row seats 14, 314 are in the forward position. The forward surface 208, 508 of the middle seat 34, 334 is offset rearwardly with respect to a forwardmost edge of the forward surface of the left seat 30, 330 and the forwardmost edge of the forward surface of the right seat 32, 332 to accommodate the center console 24, 324 when the second row seats, 14, 314 are in the forward position (shown in FIGS. 2 and 4). Accordingly, the forward surface 208, 508 of the middle seat 34, 334 can define a recessed section 272, 572, e.g. recessed with respect to the forward most edges of the left seat 30, 330 and the right seat 32, 332, that is shaped to receive a rear surface 260, 560 of the center console 24, 324. This recessed section can define part of the forward curve and/or contoured surface, e.g. contoured surface 270 described above. Accordingly the displacement of the second row seats 14, 314 into the forward position is not limited by the middle seat 34, 334 contacting the center console 24, 324.

A vehicle seating arrangement that allows the second row seats to nest with the first row seats to provide an increased area for ingress and egress has been described in particularity with regard to two specific embodiments. Modifications and alterations will occur to those skilled in the art upon reading and understanding the preceding detailed description. The invention, which is defined by the appended claims, is not limited to only the embodiments described above. Instead, the invention is defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A seating arrangement for a motor vehicle including:
   first row seats including a driver's seat and a passenger's seat, respective rear surfaces of the first row seats defining a rear contoured surface from an outboard lateral edge of the passenger's seat to an outboard lateral edge of the driver's seat;
   second row seats disposed behind the first row seats with respect to a forward direction of travel for the motor vehicle, the second row seats being slidable in a longitudinal direction between a forward position and a rearward position, respective forward surfaces of the second row seats defining a front contoured surface from and between respective outboard lateral edges of the second row seats, wherein the front contoured surface corresponds in shape and dimensions with the rear contoured surface such that the second row seats nest with the first row seats when the second row seats are moved toward the forward position;
   wherein each second row seat includes a base and a seat back, wherein the forward surfaces of the second row seats defining the front contoured surface are generally vertically oriented forward surfaces of the respective bases of the second row seats.

2. The seating arrangement of claim 1, wherein the second row seats include a left seat, a right seat and a middle seat that is disposed between the left seat and the right seat, wherein the left seat nests with the driver's seat and the right seat nests with the passenger's seat.

3. The seating arrangement of claim 2, wherein the left seat is movable with respect to the right seat.

4. The seating arrangement of claim 3, wherein the left seat is movable with respect to the middle seat.

5. The seating arrangement of claim 2, wherein in cross sections taken parallel to the longitudinal direction and a lateral direction of the vehicle, the rear contoured surface of the driver's seat having a generally concave configuration and the front contoured surface of the left seat having a generally convex configuration that complements the generally concave configuration of the driver's seat.

6. The seating arrangement of claim 2, further comprising a center console disposed between the driver's seat and the passenger's seat, a rear surface of the center console further defines the rear contoured surface and the middle seat nests with the console.

7. The seating arrangement of claim 6, wherein the forward surface of the middle seat is offset rearwardly with respect to a forwardmost edge of the forward surface of the left seat and a forwardmost edge of the forward surface of the right seat to accommodate the center console when the second row seats are in the forward position.

8. The seating arrangement of claim 1, wherein each base includes a generally horizontal resting surface upon which an occupant rests, the resting surface being generally horizontally oriented when the second row seats are in the forward position.

9. The seating arrangement of claim 8, wherein the seat back pivots with respect to the base and the seat back is upright when the second row seats are in the forward position.

10. The seating arrangement of claim 8, wherein the front contoured surface extends from the horizontal resting surface to a lower surface of the base.

11. A seating arrangement for a motor vehicle comprising:
    a first row seat including a seat back having a contoured rear surface defining a rear contour in a plane that is parallel to a lateral and a longitudinal axis of the motor vehicle;
    a second row seat laterally aligned with and disposed behind the first row seat with respect to a forward direction of travel for the motor vehicle, the second row seat being slidable in the longitudinal axis between a forward position and a rearward position and including a base having a contoured forward surface defining a forward contour in the plane that is parallel to the lateral and the longitudinal axis, when in the forward position a forwardmost point on the forward contour is disposed forward a rearwardmost point on the rear contour and a rearwardmost point on the forward contour is disposed rearward the rearwardmost point on the rear contour.

12. The seating arrangement of claim 11, wherein the first row seat includes a driver's seat and a passenger's seat, wherein the contoured rear surfaces of the of the driver's seat and the passenger's seat define the rear contour in the plane that is parallel to the lateral and the longitudinal axis between an outboard lateral edge of the passenger's seat and an outboard lateral edge of the driver's seat.

13. The seating arrangement of claim 12, wherein the second row seat includes a left seat, a right seat and a middle seat that is disposed between the left seat and the right seat, wherein the left seat nests with the driver's seat and the right seat nests with the passenger's seat.

14. The seating arrangement of claim 13, wherein the left seat is movable with respect to the right seat and with respect to the center seat.

15. The seating arrangement of claim 13, further comprising a center console disposed between the driver's seat and the passenger's seat, a rear surface of the center console further defines the rear contour and the middle seat nests with the console.

16. The seating arrangement of claim 11, wherein the driver's seat includes a generally convex rear surface and the left seat includes a generally concave rear surface that matches in shape and dimensions with the generally convex rear surface of the driver's seat.

17. The seating arrangement of claim 11, further comprising a third row seat laterally aligned with and disposed behind the second row seat with respect to the forward direction of travel for the motor vehicle.

18. A seating arrangement for a motor vehicle comprising:
first row seats including a driver's seat, a passenger's seat, and a center console disposed between the driver's seat and the passenger's seat, respective rear surfaces of the first row seats defining a rear contoured surface between an outboard lateral edge of the passenger's seat and an outboard lateral edge of the driver's seat and a rear surface of the center console defining a portion of the rear contoured surface;
second row seats disposed behind the first row seats with respect to a forward direction of travel for the motor vehicle, the second row seats being slidable in a longitudinal direction between a forward position and a rearward position, respective forward surfaces of the second row seats defining a front contoured surface between respective outboard lateral edges of the second row seats, wherein the front contoured surface includes a recessed section corresponding in shape and dimensions with the portion of the rear contoured surface defined by the rear surface of the center console such that the second row seats nest with the first row seats including the center console when the second row seats are moved toward the forward position.

19. The seating arrangement of claim 18, wherein the second row seats include a left seat, a right seat and a middle seat that is disposed between the left seat and the right seat, wherein the left seat nests with the driver's seat, the right seat nests with the passenger's seat, and the middle seat nests with the center console, and a forward surface of the middle seat is offset rearwardly with respect to a forwardmost edge of a forward surface of the left seat and a forwardmost edge of a forward surface of the right seat to accommodate the center console when the second row seats are in the forward position.

* * * * *